(12) United States Patent
Park (10) Patent No.: US 7,564,701 B2
(45) Date of Patent: *Jul. 21, 2009

(54) METHOD AND APPARATUS FOR REGULATING AN OUTPUT CURRENT FROM A POWER CONVERTER

(75) Inventor: Chan Woong Park, Kangnam-Gu Seoul (KR)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/167,091

(22) Filed: Jul. 2, 2008

(65) Prior Publication Data

US 2008/0266906 A1 Oct. 30, 2008

Related U.S. Application Data

(63) Continuation of application No. 11/086,600, filed on Mar. 21, 2005, now Pat. No. 7,414,862.

(51) Int. Cl.
*H02M 3/335* (2006.01)
(52) U.S. Cl. ....................................................... 363/16
(58) Field of Classification Search .................... 363/16, 363/95, 97, 131
See application file for complete search history.

(56) References Cited

U.S. PATENT DOCUMENTS

| | | |
|---|---|---|
| 5,140,511 A | 8/1992 | Lee et al. |
| 5,815,380 A | 9/1998 | Cuk et al. |
| 5,914,865 A | 6/1999 | Barbehenn et al. |
| 6,577,509 B2 | 6/2003 | Deboy et al. |
| 6,944,034 B1 | 9/2005 | Shteynberg et al. |
| 7,157,809 B2 | 1/2007 | Gavrila et al. |
| 7,414,862 B2 * | 8/2008 | Park ............................ 363/16 |
| 2002/0176262 A1 | 11/2002 | Tripathi et al. |

(Continued)

FOREIGN PATENT DOCUMENTS

GB    2 398 682 A    8/2004

(Continued)

OTHER PUBLICATIONS

Power Integrations, Inc., "TNY263-268 TinySwitch®-II Family—Enhanced, Energy Efficient, Low Power Off-line Switcher," Dec. 2004, pp. 1-24.

(Continued)

*Primary Examiner*—Adolf Berhane
(74) *Attorney, Agent, or Firm*—Blakely Sokoloff Taylor & Zafman LLP (57) ABSTRACT

Techniques are disclosed to control a current through a load to be coupled to an output of a power converter. In one aspect, a power converter includes an energy transfer element coupled between an input of the power converter and an output of the power converter. A power converter controller is coupled to the energy transfer element to control a transfer of energy from an input of the power converter to the output of the power converter. A current source is coupled to the output of the power converter. A switch is coupled to the current source and is coupled to be switched on and off at a duty cycle to control an average current in a load to be coupled to the output of the power converter.

26 Claims, 11 Drawing Sheets

U.S. PATENT DOCUMENTS

2004/0004446 A1   1/2004   Liu
2004/0036418 A1   2/2004   Rooke et al.

FOREIGN PATENT DOCUMENTS

WO    WO 01/48495 A1   7/2001
WO    WO 2005/101514 A2   10/2005

OTHER PUBLICATIONS

Power Integrations, Inc., "TOP242-250 TOPSwitch®-GX Family—Extended Power, Design Flexible, EcoSmart®, Integrated Off-line Switcher," Dec. 2004, pp. 1-52.

European Search Report, European Patent Application No. 06251370.0, filed, Mailed Dec. 22, 2008.

* cited by examiner

METHOD AND APPARATUS FOR REGULATING AN OUTPUT CURRENT FROM A POWER CONVERTER

REFERENCE TO PRIOR APPLICATIONS

This application is a continuation of U.S. application Ser. No. 11/086,600, filed Mar. 21, 2005, now pending, entitled "Method and Apparatus for Regulating an Output Current from a Power Converter."

BACKGROUND

1. Technical Field

The present invention relates generally to electronic circuits, and more specifically, the invention relates to a power converter.

2. Background Information

Power converters are often controlled to limit the average current to a load coupled to the output of the power converter. A typical example of such a converter is a power converter used to charge a battery. In battery charger circuits of this type, the average current provided to the load from the output of the power converter determines the time taken to charge the battery. As well as controlling the charge time, it is important to regulate the average output current to the battery to ensure the battery is being used within the specifications provided by the battery manufacturer. Other examples of power converter circuits where the average output current is regulated are lighting circuits such as those that deliver power to fluorescent tubes. In these circuits, the average current in the fluorescent tube is regulated in order to control the brightness of the fluorescent tube.

BRIEF DESCRIPTION OF THE DRAWINGS

The present invention detailed illustrated by way of example and not limitation in the accompanying Figures.

DETAILED DESCRIPTION

Embodiments of a power supply regulator that may be utilized in a power supply are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
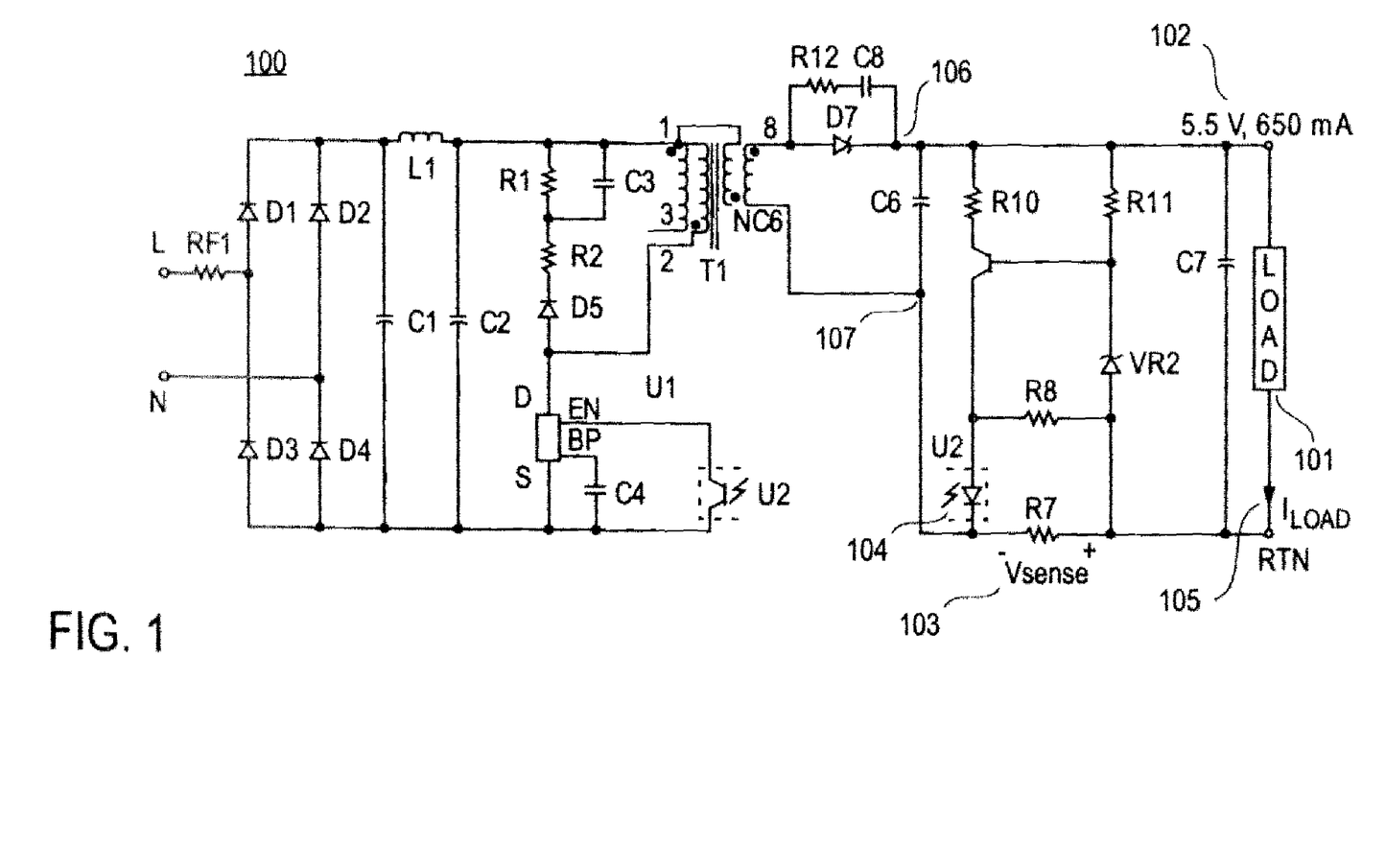
FIG. 1 is a schematic of an example power converter adapted to regulate the average current delivered to a load.

FIG. 1 is a schematic of one embodiment of a power converter in which the average output current is regulated. As shown, power converter 100 includes an input coupled to receive an input voltage. In the illustrated example, the input voltage is 90 to 264 volts of alternating current (VAC). The AC voltage is rectified with diodes D1, D2, D3 and D4 and is filtered and clamped with capacitors C1, C2 and C3, inductor L1, resistors R1 and R2, and diode D5. In the illustrated embodiment, power converter 100 is a switching converter including power converter controller circuit U1 coupled to energy transfer element, transformer T1. In the illustrated embodiment, power converter 100 includes an output circuit on the output side of transformer T1, where the output 102 of the output circuit is coupled to a load 101. In one embodiment, power converter controller circuit U1 is a power converter controller from the TinySwitch family of power converter controller circuits available from Power Integrations, Inc. of San Jose, Calif. In other embodiments, it is appreciated that other suitable types of power converter controller circuits may be utilized in accordance with the teachings of the present invention.

In one embodiment, power converter controller circuit U1 includes a power switch or transistor that is switched to regulate the transfer of energy from the input of the power converter to the output of the power converter in response to a feedback signal responsive to the output of the power converter. As shown in FIG. 1, a voltage, Vsense 103, is developed across current sensing element, resistor R7, which is proportional to the magnitude of the current $I_{LOAD}$ 105 flowing in the LOAD 101. This voltage 103 is applied across components resistor R8 and optocoupler U2 as a current sense signal. This current sense signal is coupled, through the optocoupler U2, to the power converter controller circuit U1 on the primary side of the power converter. In another embodiment, the current sensing element could also be a current transformer or other suitable element to sense current in accordance with the teachings of the present invention.

In the illustrated example, power converter controller U1 regulates the power delivered to output 102 of the power converter in order to maintain $I_{LOAD}$ at the desired average regulation value. In the example shown in FIG. 1, the power converter controller U1 regulates the power delivered to the output of the power converter by skipping switching cycles. The decision of whether to skip a cycle or not is made based on whether the feedback signal received at the EN pin of power converter controller circuit U1 is above or below a threshold value set by the circuitry internal to power converter controller circuit U1. The circuit of power converter controller circuit U1 therefore regulates in response to a digital feedback signal. It is noted that a number of other control techniques could be used such as pulse width modulator (PWM) current mode or PWM voltage mode, which would use for example analog feedback signals. The power converter circuit example of FIG. 1 also includes output voltage sensing using components transistor Q1 and diode VR2 in order to regulate the maximum output voltage applied to the load 101.

Figure 2:
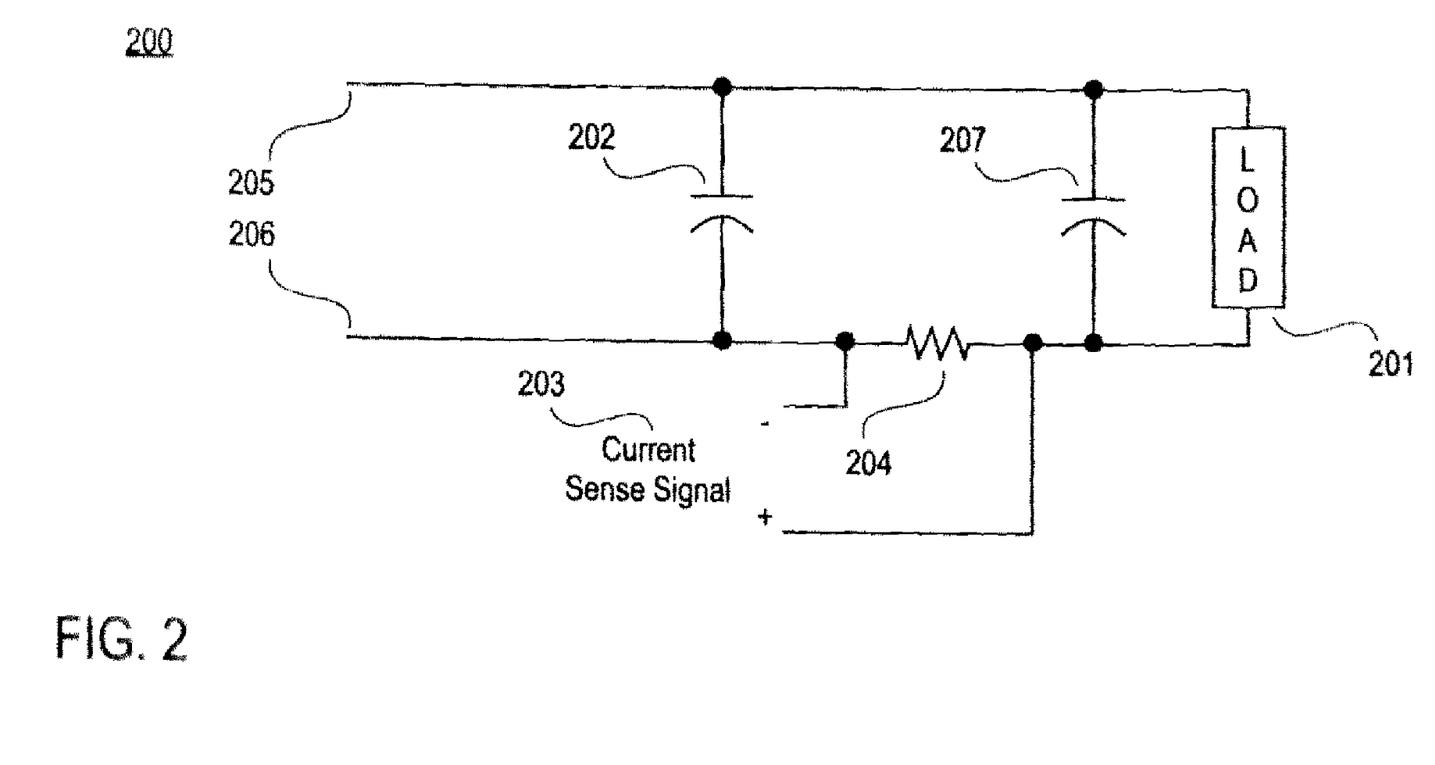
FIG. 2 is a schematic that illustrates a power converter output including a current sense element and a current sense signal.

FIG. 2 shows a simplified schematic 200 of another embodiment of circuitry that may be included at the output of a power converter to regulate the average current in the load. In the illustrated example, capacitors 202 and 207 may be considered as being equivalent to capacitors C6 and C7, respectively, of FIG. 1. Current sense element 204 may be considered as being equivalent to R7 of FIG. 1. Nodes 205 and 206 may be considered as being equivalent to nodes 106 and 107, respectively, of FIG. 1. In the illustrated example, current sense signal 203 is coupled to be received by a control circuit, which is used to regulate the average current delivered to the load 201. In some low cost circuits, capacitor 207 may be eliminated, which introduces more ripple voltage on the output across the load 201.

Figure 3:
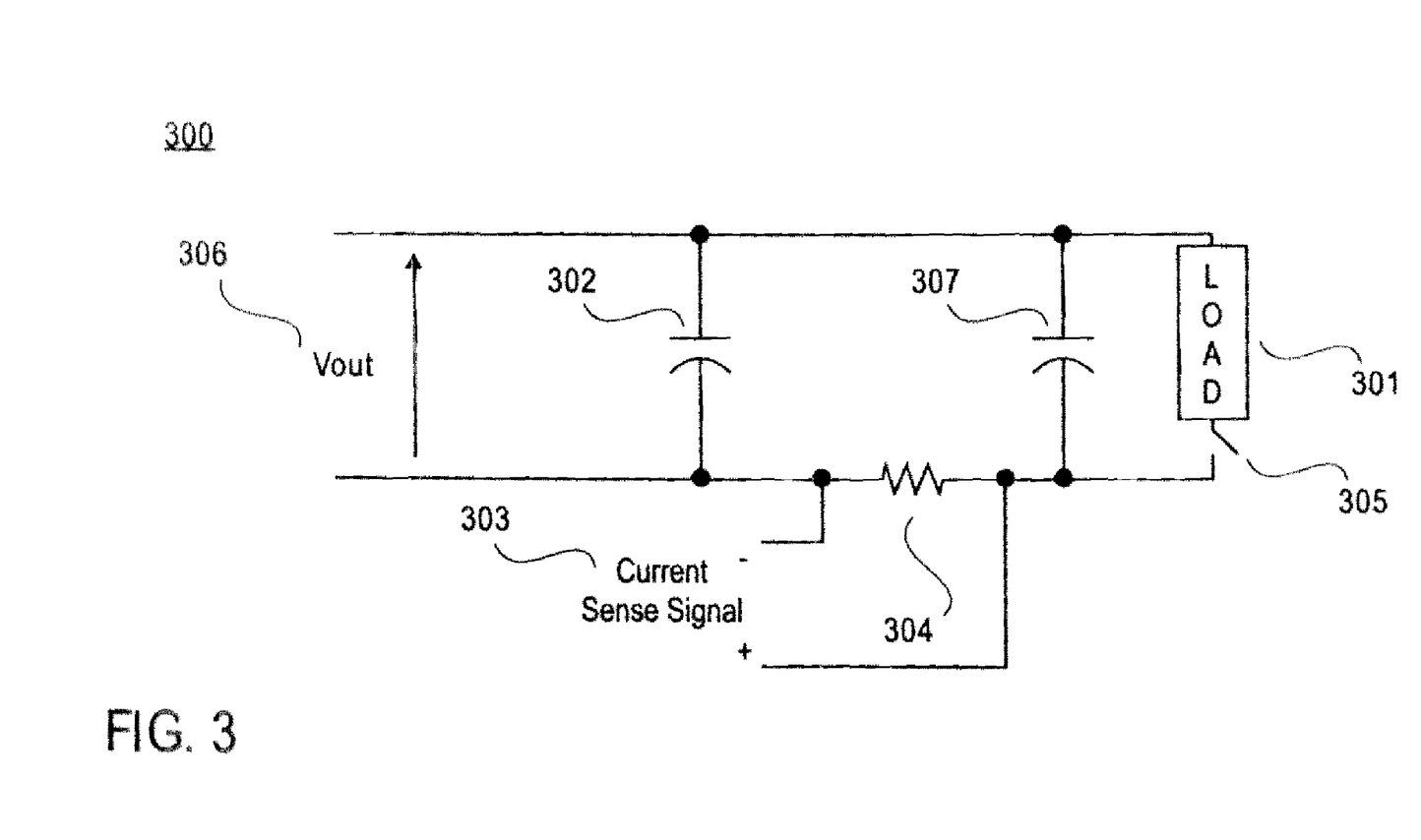
FIG. 3 is a schematic that illustrates a power converter output including a switch that is coupled to the output.

FIG. 3 is a simplified schematic of yet another embodiment of a circuit 300 that may be included at the output of a power converter to regulate the average current in the load. Compared to the embodiment illustrated in FIG. 2, a switch 305 has been introduced in circuit 300 coupled in series with the load 301. In one embodiment, load 301 may include one or more light emitting diodes (LEDs) coupled together as a chain of LEDs. The operating principle of circuit 300 is that the switch 305 is turned on and off at a duty cycle appropriate to control the average light output of the LED chain of load 301, while current sense element 304 senses the current in the load 301 and coupled current sense signal 303 to circuitry that regulates the output of the power converter to retain a constant LED current while switch 305 is on.

In one embodiment, an application for circuit 300 may be for use in embodiments of power conversion circuits that regulate not just the average output current to the load but also the instantaneous current. Furthermore, embodiments of such power conversion circuits control the instantaneous current as well as the average current in the load independently.

In particular, one embodiment of a power conversion circuit in accordance with the teachings of the present invention is used to deliver power to a plurality of LEDs coupled to the output of the power converter as the load. In this example embodiment, the instantaneous LED current is accurately regulated to maintain the correct spectral color output from the LED when the LED is illuminated. The average LED current (and therefore light output) is regulated by turning the LEDs completely off for a percentage of the time. The ratio of the LED on time to off time is referred to as the duty cycle. The frequency at which the LEDs are turned on and off in this way, is chosen such that the human eye cannot detect flickering as the LEDs turn on and off. In one embodiment the on/off control frequency is between 200 Hz and 20 kHz. In one embodiment, since the on/off duty cycle is used to control average LED current and therefore light intensity or output, the instantaneous LED current is controlled immediately when the LEDs are turned on to allow linear control of the average LED current to low duty cycles in accordance with the teachings of the present invention.

Example applications of where embodiments of power conversion circuits may be utilized include backlighting applications for liquid crystal display (LCD) television (TV) displays, computer monitor panels, or the like. In these types of applications, a white backlight may be generated by using 3 chains of LEDs, one red, one green and one blue. Each chain of LEDs is coupled to a separate power conversion circuit output and is independently controlled. The combined light output of the red, green and blue LED chains is mixed to produce the desired white light. Since the individual light intensity and spectral output of each LED is sensitive to the current flowing in it, very accurate control of the current provided to each LED chain is provided as soon as the LEDs are turned on in accordance with the teachings of the present invention. The average light output in these applications is controlled to generate the correct balance of the light contribution from each of the red, green and blue LED chains so as to control the overall intensity of the backlight, for user controller dimming for example, in accordance with the teachings of the present invention.

Referring now back to the embodiment illustrated in FIG. 3, switch 305 is illustrated in FIG. 3 as a mechanical switch. In another embodiment, a semiconductor switch such as a bipolar transistor or a metal oxide semiconductor field effect transistor (MOSFET) may be utilized for switch 305. However, the presence of capacitors 302 and 307, which limit power supply output ripple voltage and noise within acceptable levels, may cause an undesirable operating characteristic.

During the period switch 305 is off, the output of the power conversion circuit is completely disconnected, which results in a no-load condition. Under these conditions, the power conversion circuit output voltage will increase. The increase may be small and is undesirable, but some increase will result due to the practical operation of power conversion circuits. A consequence of this increase in power conversion circuit output voltage when switch 305 is off is that when switch 305 is again turned on, the voltage across capacitors 302 and 307 is in excess of that necessary to provide the required load current. Capacitors 302 and 307 therefore discharge through the LED chain in load 301 causing a spike in the LED current each time load switch 305 turns on. The discharge current flowing through capacitor 307 is not even sensed by the current sense element 304 and the power converter loop cannot therefore respond. However, even the discharge current flowing through capacitor 302, which the power converter loop does sense through sense element 304, is not eliminated since the power converter cannot regulate the energy that has already been delivered to the output capacitors.

Figure 4:
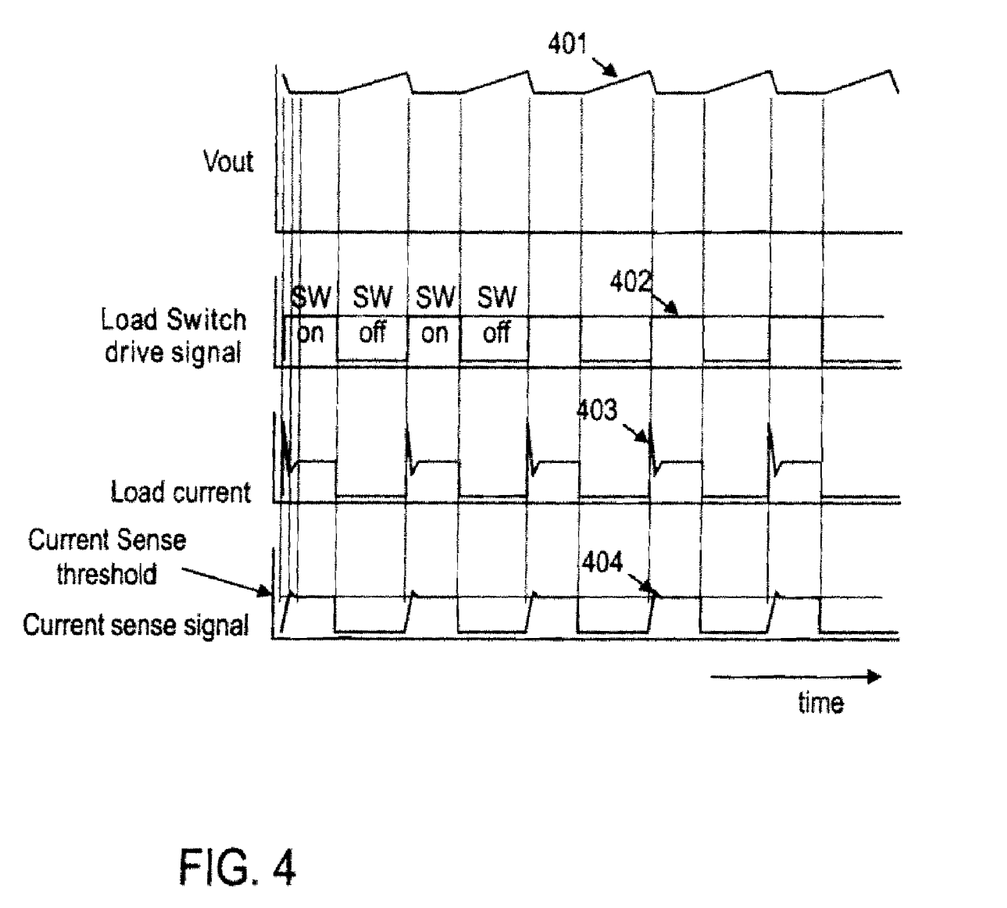
FIG. 4 is a diagram illustrating examples of waveforms present in a power converter circuit.

Examples of waveforms present in the power converter circuitry are illustrated in FIG. 4. Waveform 401 of FIG. 4 illustrates that the power conversion circuit output voltage rises during the period when the load switch is off, as shown with waveform 402. The load current 403 subsequently overshoots when the load switch turns on causing the current sense signal 404 to also overshoot above a current sense threshold which would be set by the circuit designer as appropriate for the particular type of LED being employed in the load. The power conversion circuit responds at a rate dependent on the speed of the control loop in the particular power converter causing the load current 403 to drop below the required level before settling to the desired load current. As well as causing changes in the spectral output of the LEDs, this type of behavior also results in highly non-linear average current regulation at low duty cycles of the load switch.

Figure 5:
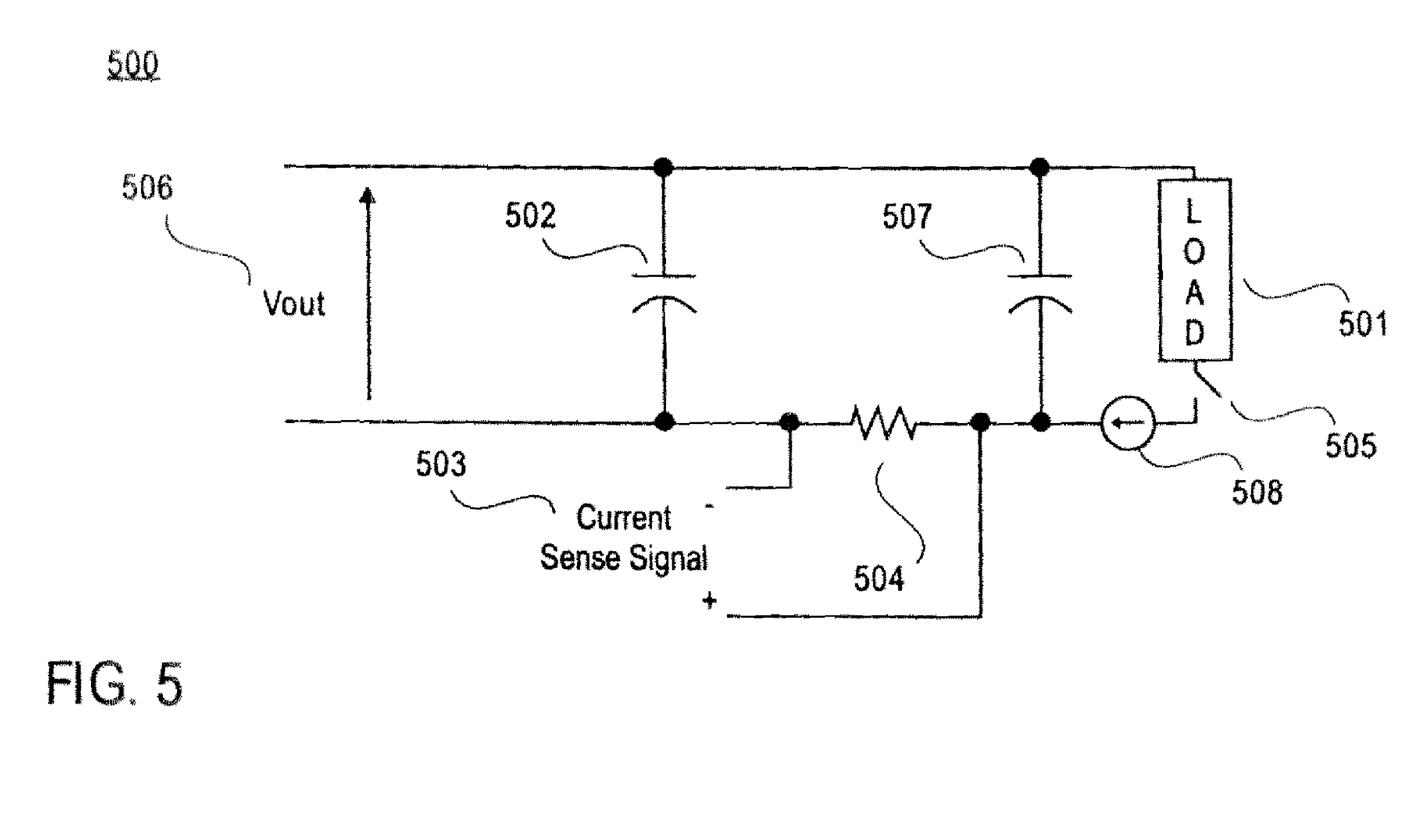
FIG. 5 is a schematic that illustrates an embodiment a power converter output including a current source and a switch coupled to the output in accordance with the teachings of the present invention.

FIG. 5 shows one embodiment of a power converter circuit 500 in accordance with the teachings of the present invention that allows the instantaneous load current to be controlled without current overshoot. As illustrated, power converter circuit 500 includes an element 508 coupled to switch 505. In one embodiment, element 508 is a current source circuit having a current threshold. The impedance of an ideal current source is zero when the current flowing through it is below the threshold value and the impedance is adjusted when the threshold current value is reach to maintain the current flowing at the threshold value. Though practical implementations of current source circuits only approximate to these ideal characteristics, the operation introduces greatly increased impedance when the current source current threshold is exceeded. For the purposes of the present disclosure, a current source circuit is defined as any circuit where the impedance increases when a current threshold is reached in order to regulate the current flowing at the current threshold value in accordance with the teachings of the present invention.

In the embodiment illustrated in FIG. 5, when switch 505 is turned on, the discharge current flowing through capacitors 502 and 507 and the load 501 increases until the threshold value of current source 508 is reached in accordance with the teachings of the present invention. In one embodiment, the impedance and therefore the voltage dropped across current source circuit 508 then increases as much as is necessary in order to regulate the current flowing through the load 501 to the current source circuit 508 threshold current value. The current sense signal 503 is still proportional to the instantaneous current flowing in current sense element 504. In one embodiment, current sense signal 503 is therefore coupled to be received by the power converter controller to be used to regulate the load current after the initial capacitive discharge current has been regulated by the current source circuit 508

In one embodiment, the current threshold of current source circuit 508 is selected to be slightly above the normal current regulation value set in the main power converter control loop using current sense signal 503. As a result, the average voltage dropped and therefore dissipation in current source 508 is reduced in accordance with the teachings of the present invention.

Figure 6:
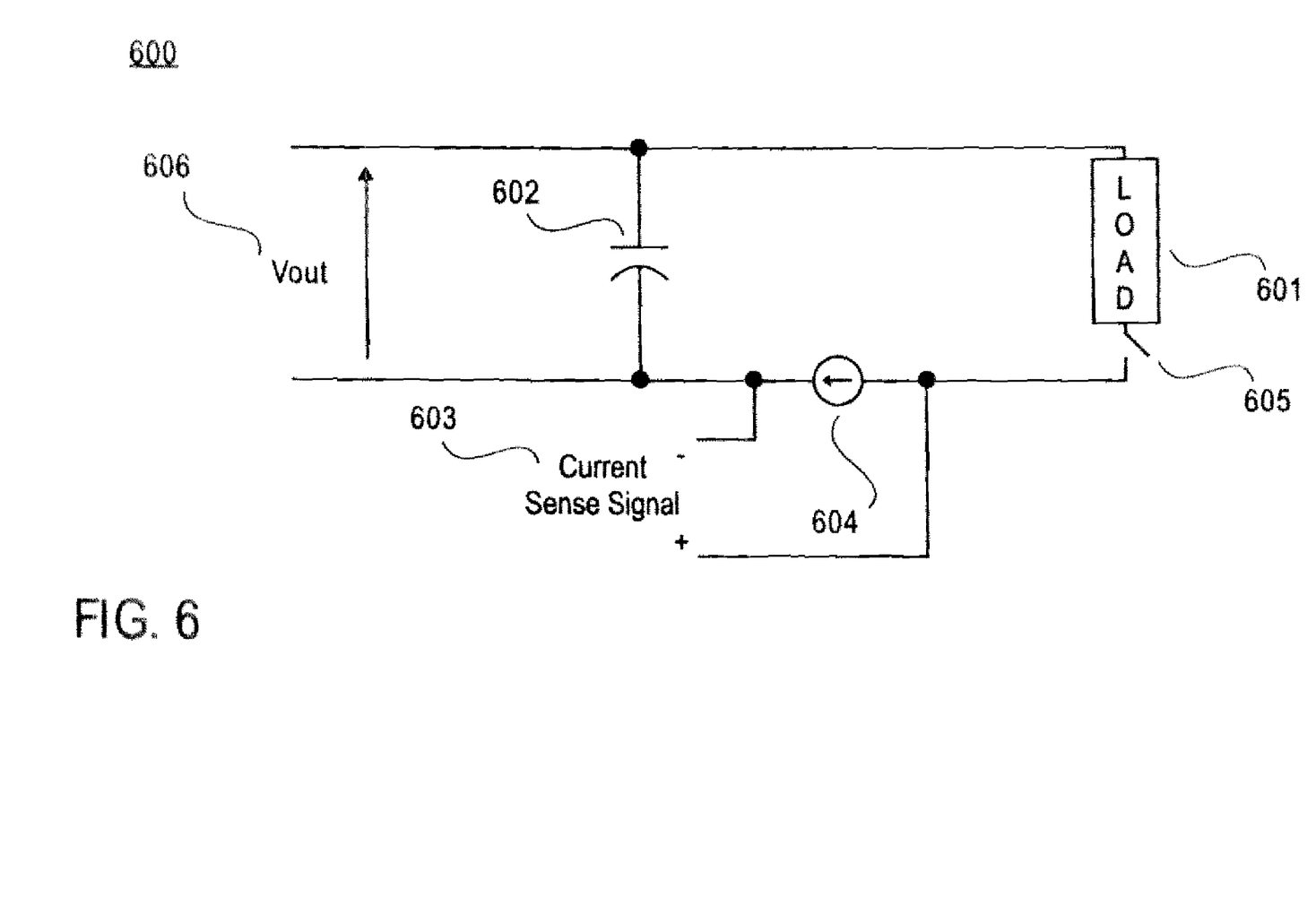
FIG. 6 is a schematic that illustrates another embodiment a power converter output including a current source and a switch coupled to the output in accordance with the teachings of the present invention.

FIG. 6 shows another embodiment of a circuit 600 in accordance with the teachings of the present invention. As shown in the depicted embodiment, circuit 600 includes a current source circuit 604, which serves as both a current source and current sense element in accordance with the teachings of the present invention. Due to the impedance characteristics of current sources discussed above, when the current source threshold of current source circuit 604 is exceeded, the voltage across current source circuit 604 increases to regulate the current flowing through current source circuit 604. This is another form of current sense signal 603, which can be used by the main power converter controller as the current sense signal to regulate the current flowing through the load in accordance with the teachings of the present invention.

In one embodiment, current source circuit 604 therefore regulates the initial capacitive discharge current from capacitor 602 through the load 601 at the time when switch 605 is first turned on and also provides the current sense signal for the main power converter control loop in accordance with the teachings of the present invention. This combined function of current source circuit 604 is particularly effective where the current sense signal utilized by the power converter is a digital signal as is employed by controller U1 in the power conversion circuit embodiment illustrated in FIG. 1. However this configuration can also be used with a power conversion circuit employing an analog feedback signal in accordance with the teachings of the present invention. In one embodiment, the output capacitor coupled directly to the load in the Figures described above is eliminated, since the current sense and instantaneous current limiting function is performed by the same circuit. This embodiment is therefore suited to applications where increased output ripple voltages may be acceptable.

Figure 7:
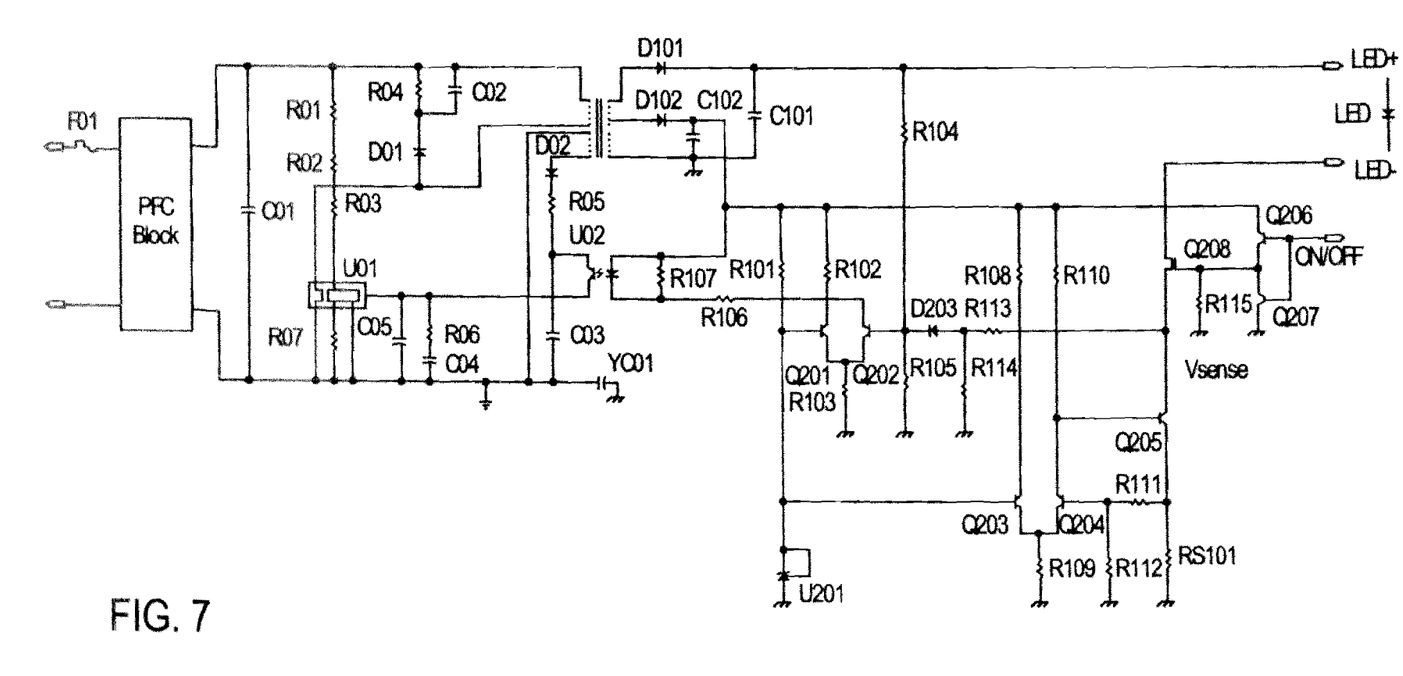
FIG. 7 is a schematic that illustrates an embodiment a power converter including a current source as a current sense element and a load current regulator in accordance with the teachings of the present invention.

FIG. 7 is a schematic illustrating an embodiment of a power conversion circuit in which the feedback signal is analog. The schematic of FIG. 7 shows a power converter with a current source circuit as a current sense element and load current regulator. In particular, FIG. 7 shows the complete detail of the power conversion circuit primary and secondary, with load switch with drive circuitry (components Q206, Q207, R115 and Q208) and current source circuit (R110, Q205, RS101, R111, R112, Q204 R109, Q203 and R108) as both current sense element and instantaneous load current regulator.

In the embodiment illustrated in FIG. 7, resistor R101 and diode U201 provide a reference voltage (2.5V or 1.25V). Transistors Q201 and Q202 form a differential amplifier to regulate the output voltage of the power converter circuit of FIG. 7. When the base voltage of transistor Q202 is higher than the base voltage of transistor Q201, the diode current of optocoupler U02 is high and the output voltage of the power converter circuit of FIG. 7 is controlled to be lower.

In the embodiment illustrated in FIG. 7, transistors Q205 and Q204 are used for controlling the load current. It is noted that the load shown in FIG. 7 is represented by a single LED. In other embodiments, the load may include a plurality of LEDs or another type of load in accordance with the teachings of the present invention. When transistor Q208 is turned on, the voltage across resistor RS101 is substantially proportional to the load current and provides load current information, which is applied to the base of transistor Q204 via the resistor divider formed with resistor R111 and resistor R112. Transistor Q204 controls the transistor Q205 base bias current to limit the transistor Q205 emitter current by comparing the voltage across resistor RS101 with the voltage between the cathode and anode of U201 and the differential amplifier formed by transistor Q203 and transistor Q204. The voltage, Vsense, appearing at transistor Q205 may be considered as a current sense signal that is therefore be regulated, thereby regulating the current flowing in resistor RS101. The collector voltage of transistor Q205 is applied to the base of transistor Q202 via resistor R113, resistor R114 and diode D203 to provide a feedback signal through optocoupler U02 in accordance with the teachings of the present invention.

Figure 8:
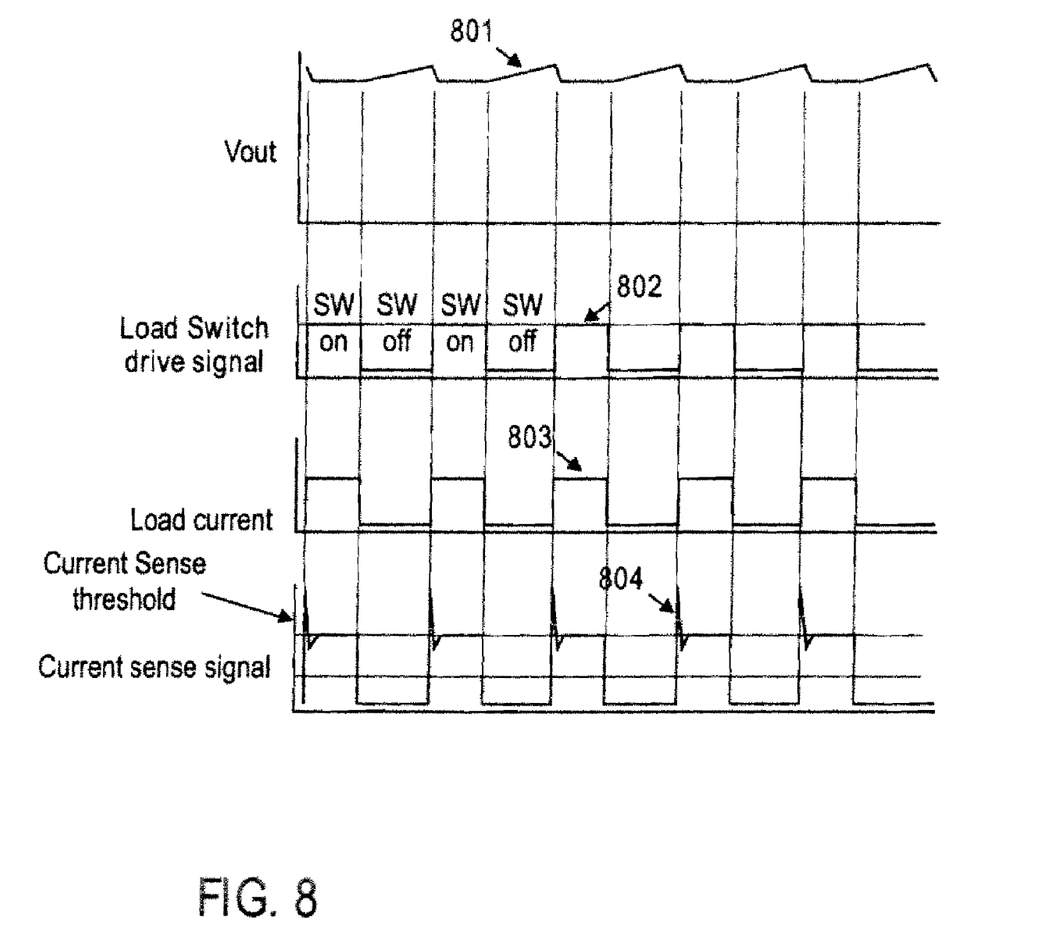
FIG. 8 is a diagram illustrating examples of waveforms present in an embodiment of a power converter circuit in accordance with the teachings of the present invention.

FIG. 8 illustrates example waveforms found in one embodiment of a power converter circuit in accordance with the teachings of the present invention. During the off time of the load switch, the output voltage increases as described with relation to the example illustrated above in FIG. 4. Due to the use of a current source circuit as the load current sense element as described above, the load current is a square wave, as shown in waveform 803 of FIG. 8, without the leading edge current spike as compared to waveform 403 of FIG. 4. The LED current can therefore be controlled linearly to very low duty cycles without the nonlinearity previously introduced due to the load current spike when the load switch is first switched on in accordance with the teachings of the present invention.

Figure 9:
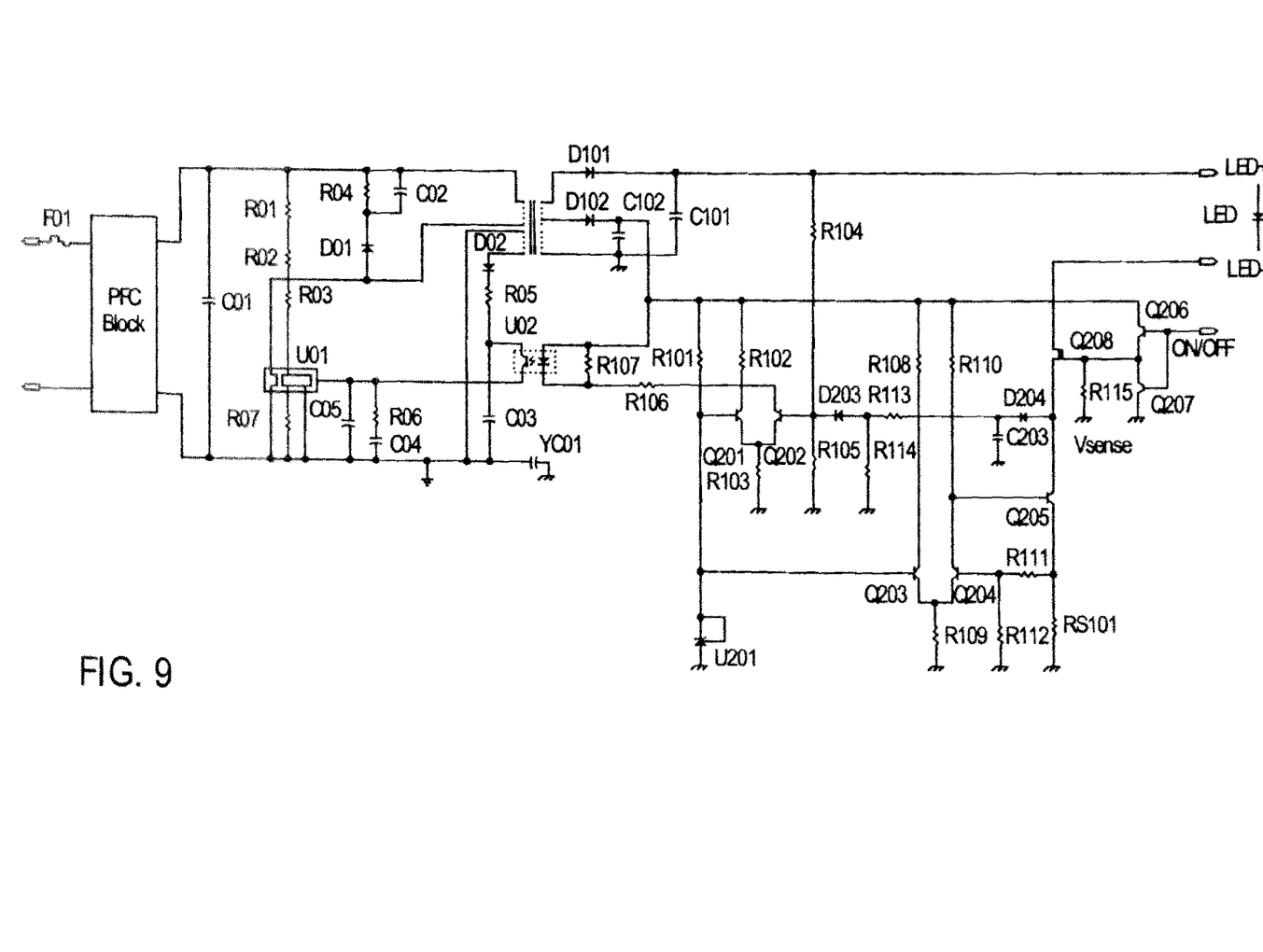
FIG. 9 is a schematic that illustrates another embodiment of a power converter including a current source as a current sense element and a load current regulator including feedback time constant extension in accordance with the teachings of the present invention.

FIG. 9 is a schematic that illustrates yet another embodiment of a circuit in accordance with the teachings of the present invention. The circuit embodiment illustrated in FIG. 9 shares similarities with the circuit embodiment illustrated in FIG. 7. The circuit embodiment illustrated in FIG. 9 includes the addition of diode D204 and capacitor C203. In the illustrated embodiment, capacitor C203 is peak charged during the initial voltage spike across transistor Q205, which further sustains the feedback signal applied to the base of transistor Q202. By further sustaining the feedback signal applied to the base of transistor Q202, transistor Q208, or the load switch, may be switched at very low duty cycle during the normal off period to keep the output voltage from increasing as much during the switch off period of transistor Q208 in accordance with the teachings of the present invention. This has the positive influence of reducing the power dissipation in the current sense element, or transistor Q205, at the beginning of the on period of the load switch, transistor Q208.

Figure 10:
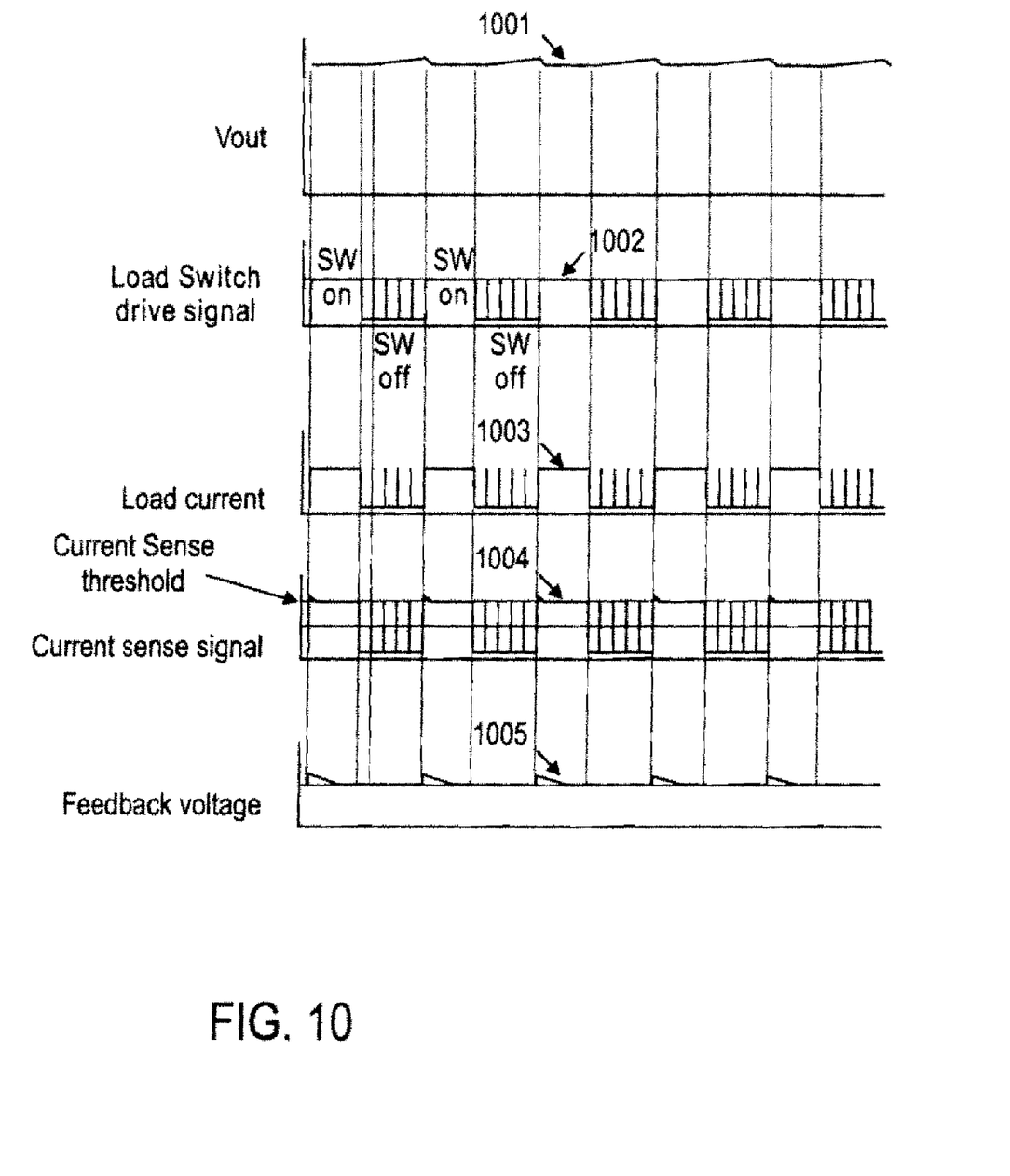
FIG. 10 is a diagram illustrating examples of waveforms present in another embodiment of a power converter circuit in accordance with the teachings of the present invention.

To illustrate, FIG. 10 is a diagram illustrating waveforms from an embodiment of a power converter in accordance with the teachings of the present invention. As shown in the waveforms of FIG. 10, the leading edge spike in the current sense signal waveform 1004 is much smaller than the equivalent spike in the current sense signal waveform 804 of FIG. 8 in accordance with the teachings of the present invention. FIG. 10 also illustrates the very short turn on pulses in transistor Q208 during the 'SW off' period, as indicated with load switch drive signal waveform 1002, which helps to reduce the voltage increase of the Vout waveform 1001 during the load switch off period in accordance with the teachings of the present invention.

Figure 11:
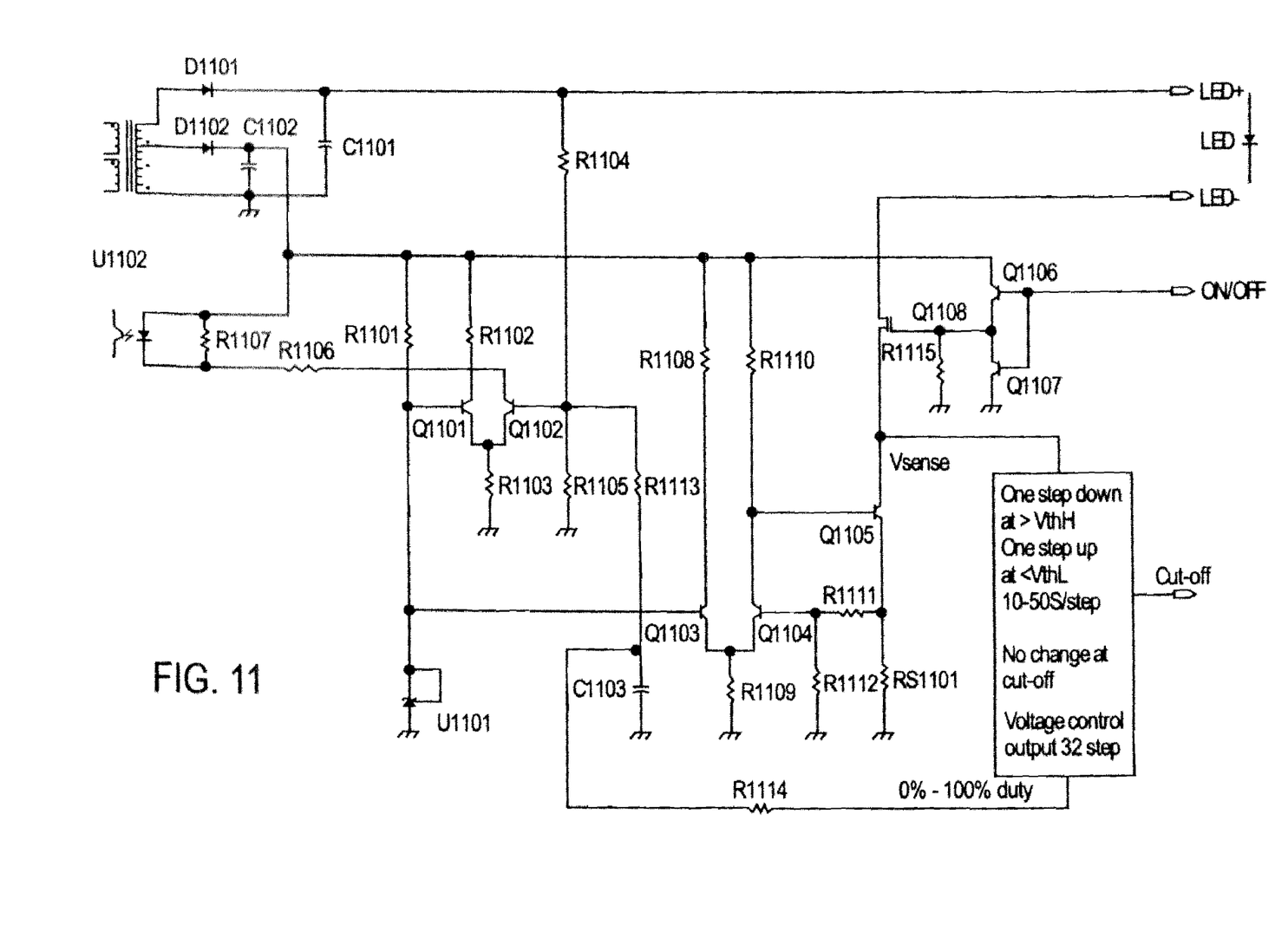
FIG. 11 is a schematic that illustrates yet another embodiment of a power converter with current source circuit as a sense element and integrated circuit adapted to generate a feedback signal in accordance with the teachings of the present invention.

FIG. 11 is a schematic that illustrates yet another embodiment of a circuit in accordance with the teachings of the present invention. The circuit embodiment illustrated in FIG. 11 shares similarities with the circuit embodiment illustrated in FIG. 9 in basic functionality. However the Vsense signal is no longer coupled to diode D204 but instead is coupled to integrated circuit 1101. In the illustrated embodiment, integrated circuit 1101 is coupled to convert the Vsense signal received into a quasi analog stepped output feedback signal 1102, which is coupled through resistor R1113 to the base of transistor Q1102, which controls the feedback current flowing through the LED of optocoupler U1102. In operation, the Vsense signal is compared to an internally generated threshold voltage VthL within integrated circuit 1101. When Vsense is >VthL, output feedback signal 1102 is stepped down. If the Vsense signal is <VthL, the output feedback signal 1102 is stepped up. In another embodiment, the polarity of output signal 1102 may be inverted with a modified circuit configuration in accordance with the teachings of the present invention. One advantage of using an integrated circuit as shown in the illustrated embodiment is that storage components such as for example capacitor C203 in FIG. 9 may be removed. Instead, when the Vsense signal falls to zero when switch Q1108 is off, the output feedback signal 1102 can be held at the same level. In another embodiment, the integrated circuit 1101 may also include switch Q1108 and the ON/OFF signal 1103 could then couple directly to the integrated circuit 1103 in accordance with the teachings of the present invention.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A power converter, comprising:
an energy transfer element coupled between an input of the power converter and an output of the power converter;
a power converter controller coupled to the energy transfer element to control a transfer of energy from an input of the power converter to the output of the power converter;
a current source coupled to the output of the power converter; and
a switch coupled to the current source and coupled to be switched on and off at a duty cycle to control an average current in a load to be coupled to the output of the power converter.

2. The power converter of claim 1 wherein the current source is coupled to the power converter controller to provide a current sense signal.

3. The power converter of claim 1 wherein the current source is coupled to an integrated circuit to provide a current sense signal, wherein the integrated circuit is coupled to provide a feedback signal to the power converter controller.

4. The power converter of claim 1 further comprising a current sensing element coupled to the current source to provide a current sense signal coupled to be received by the power converter controller.

5. The power converter of claim 4 wherein the current sensing element comprises a resistor.

6. The power converter of claim 4 wherein the current sensing element comprises a current transformer.

7. The power converter of claim 1 wherein the current source is coupled to limit an output current of the power converter to below a threshold value.

8. The power converter of claim 1 wherein the load comprises one or more light emitting diodes (LEDs).

9. The power converter of claim 1 wherein the power converter controller is coupled to regulate the output of the power converter.

10. A power converter, comprising:
an energy transfer element coupled between an input of the power converter and an output of the power converter;
a power converter controller coupled to the energy transfer element to control a transfer of energy from an input of the power converter to the output of the power converter;
a current source coupled to the output of the power converter, the current source coupled to provide a current sense signal to the power converter controller; and
a switch coupled to the current source and coupled to be switched on and off at a duty cycle to control an average current in a load to be coupled to the output of the power converter.

11. The power converter of claim 10 wherein a load current through the load is to be conducted through the current source.

12. The power converter of claim 10 wherein the load comprises one or more light emitting diodes (LEDs) to be coupled to the output of the power converter.

13. The power converter of claim 10 wherein the current source is coupled to the output of the power converter to limit an output current of the power converter through the load to below a threshold value.

14. A power converter, comprising:
an energy transfer element coupled between an input of the power converter and an output of the power converter;
a power converter controller coupled to the energy transfer element to control a transfer of energy from the input of the power converter to the output of the power converter, wherein a load is to be coupled to the output of the power converter;

a current source having a first end and a second end, wherein the first end of the current source is coupled to a current sense element and the second end of the current source is to be coupled to the load, wherein the current sense element is coupled to sense a current through the load; and a switch coupled between the load and the second end of the current source and coupled to be switched on and off at a duty cycle to control an average current through the load, wherein the current through the load is substantially equal to a current through the switch and the current source.

15. The power converter of claim 14 wherein the current source is coupled to limit the current through the load to a current threshold value.

16. The power converter of claim 14 wherein the current sense element is coupled to the power converter controller to provide a feedback signal and wherein the power converter controller controls the transfer of energy by switching the switch in response to the feedback signal.

17. The power converter of claim 14 wherein the current sense element is coupled to the power converter controller to provide a feedback signal and wherein the power converter controller is coupled to regulate the output of the converter in response to the feedback signal.

18. The power converter of claim 16 wherein the feedback signal is a digital signal.

19. The power converter of claim 17 wherein the feedback signal is an analog signal.

20. The power converter of claim 14 wherein the power converter controller is an integrated circuit.

21. A power converter circuit comprising:
an energy transfer element coupled between an input of the power converter and an output of the power converter;
a power converter controller coupled to the energy transfer element to control a transfer of energy from an input of the power converter to the output of the power converter in response to a current source, wherein a load is to be coupled to the output of the power converter;
a current source coupled to the output of the power converter and coupled to limit a current through the load when the current through the load exceeds a current threshold level; and
a switch coupled between the load and the current source and coupled to be switched on and off at a duty cycle to control an average current through the load, wherein the current through the load is substantially equal to a current through the switch and the current source.

22. The power converter of claim 21 wherein the current sense element is coupled to the power converter controller to provide a feedback signal and wherein the power converter controller controls the transfer of energy in response to the feedback signal.

23. The power converter of claim 21 wherein the current source is coupled to limit the current through the load and through the switch to a current threshold value.

24. The power converter of claim 22 wherein a current signal output from the current source is representative of the feedback signal.

25. The power converter of claim 22 wherein the current source is coupled to detect when the current through the load is below a current threshold value.

26. A method for regulating an output of the power converter, comprising:
transferring energy from an input to an output of the power converter;
regulating a current through a load coupled to the output of the power converter in response to a feedback signal;
switching a switch coupled directly to the load to regulate the average current through the load;
sensing the current through the load with a current source;
generating the feedback signal in response to the sensed current through the load; and
limiting the current through the load and the switch when the current through the load exceeds a current threshold value.

* * * * *